US012630715B2

(12) United States Patent
Yasumoto et al.

(10) Patent No.: US 12,630,715 B2
(45) Date of Patent: May 19, 2026

(54) RESIN COMPOSITION, PREPREG, FILM WITH RESIN, METAL FOIL WITH RESIN, METAL-CLAD LAMINATE, AND PRINTED WIRING BOARD

(71) Applicant: PANASONIC INTELLECTUAL PROPERTY MANAGEMENT CO., LTD., Osaka (JP)

(72) Inventors: Jun Yasumoto, Fukushima (JP); Rihoko Watanabe, Osaka (JP); Teppei Washio, Fukushima (JP); Hiroharu Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 617 days.

(21) Appl. No.: 18/012,161

(22) PCT Filed: Jun. 14, 2021

(86) PCT No.: PCT/JP2021/022467

§ 371 (c)(1),
(2) Date: Dec. 21, 2022

(87) PCT Pub. No.: WO2021/261305

PCT Pub. Date: Dec. 30, 2021

(65) Prior Publication Data

US 2023/0257581 A1 Aug. 17, 2023

(30) Foreign Application Priority Data

Jun. 24, 2020 (JP) ................................ 2020-109130

(51) Int. Cl.

*C08L 79/08* (2006.01)
*C08J 5/24* (2006.01)

(Continued)

(52) U.S. Cl.

CPC ............... *C08L 79/085* (2013.01); *C08J 5/24* (2013.01); *C08K 5/521* (2013.01); *C08L 25/08* (2013.01);

(Continued)

(58) Field of Classification Search

CPC .. C08F 222/40; C08F 222/402; C08F 220/52; C08F 220/70; C08F 222/404;

(Continued)

(56) References Cited

U.S. PATENT DOCUMENTS

| | | | |
|---|---|---|---|
| 6,622,370 | B1 | 9/2003 | Sherman et al. |
| 2015/0332806 | A1 | 11/2015 | Hayakawa et al. |

(Continued)

FOREIGN PATENT DOCUMENTS

| | | |
|---|---|---|
| CN | 102115540 | 7/2011 |
| CN | 109810504 | 5/2019 |

(Continued)

OTHER PUBLICATIONS

BMI-1500 Technical Data Sheet by Designer Molecule Inc. (Year: 220).*

(Continued)

*Primary Examiner* — Mark S Kaucher
(74) *Attorney, Agent, or Firm* — GREENBLUM & BERNSTEIN, P.L.C.

(57) ABSTRACT

A resin composition contains a maleimide compound (A) and a phosphorus-containing compound (B). The maleimide compound (A) includes a first maleimide compound (A1) having an alkyl group, of which a carbon number is equal to or greater than six, and/or an alkylene group, of which a carbon number is equal to or greater than six. The phosphorus-containing compound (B) includes a phosphorus-containing compound (B1) having a structure expressed by the following formula (b1), where s indicates an integer falling (Continued)

within a range from 1 to 10, Z indicates either an arylene group or an ester bond expressed by the following formula (b1.1), $R^1$ to $R^3$ each independently indicate either a hydrogen atom or a monovalent organic group, and * indicates a bond.

17 Claims, 9 Drawing Sheets

(51) Int. Cl.
*C08K 5/521* (2006.01)
*C08L 25/08* (2006.01)

(52) U.S. Cl.
CPC ....... *C08L 2201/02* (2013.01); *C08L 2203/16* (2013.01); *C08L 2203/20* (2013.01)

(58) Field of Classification Search
CPC .............. C08F 222/406; C08F 222/408; C08F 230/02; C08K 5/5313; C08K 5/0066; C08K 5/5521; C08L 79/085
See application file for complete search history.

(56) References Cited

U.S. PATENT DOCUMENTS

| | | | | |
|---|---|---|---|---|
| 2016/0168378 | A1* | 6/2016 | Umehara | H05K 1/0353 524/508 |
| 2016/0366761 | A1 | 12/2016 | Hoshi et al. | |
| 2018/0112072 | A1* | 4/2018 | Kushihara | C08L 63/00 |
| 2018/0170005 | A1 | 6/2018 | Saito et al. | |
| 2018/0222152 | A1 | 8/2018 | Umeda et al. | |
| 2020/0002365 | A1* | 1/2020 | Zhang | C08L 71/126 |
| 2020/0095504 | A1 | 3/2020 | Hu et al. | |
| 2021/0214547 | A1 | 7/2021 | Honda et al. | |
| 2023/0193024 | A1* | 6/2023 | Tsuda | C08G 65/48 428/195.1 |

FOREIGN PATENT DOCUMENTS

| | | |
|---|---|---|
| JP | 2007-191675 | 8/2007 |
| JP | 2014-133877 | 7/2014 |
| JP | 2016-131243 | 7/2016 |
| JP | 2016-196549 | 11/2016 |
| JP | 2017-2305 | 1/2017 |
| JP | 2018-44065 | 3/2018 |
| JP | 2018-83893 | 5/2018 |
| JP | 2019-44128 | 3/2019 |
| JP | 2019-173010 | 10/2019 |
| JP | 2020-2217 | 1/2020 |
| JP | 2020-33472 | 3/2020 |
| TW | I673280 B * | 9/2018 |
| WO | 2017/017923 | 2/2017 |
| WO | 2018/051715 | 3/2018 |
| WO | 2019/230945 | 12/2019 |

OTHER PUBLICATIONS

BMI-3000 Technical Data Sheet by Designer Molecule Inc. (Year: 2020).*

BMI-689 Technical Data Sheet by Designer Molecule Inc. (Year: 220).*

Official Communication issued in International Patent Application No. PCT/JP2021/022468, dated Aug. 17, 2021.

Official Communication issued in International Patent Application No. PCT/JP2021/022470, dated Aug. 17, 2021.

Official Communication issued in International Patent Application No. PCT/JP2021/022467, dated Aug. 10, 2021.

Office Action issued in U.S. Appl. No. 18/012,176, filed Sep. 9, 2024.

Office Action issued in U.S. Appl. No. 18/012,184, dated Jun. 24, 2025.

* cited by examiner

RESIN COMPOSITION, PREPREG, FILM WITH RESIN, METAL FOIL WITH RESIN, METAL-CLAD LAMINATE, AND PRINTED WIRING BOARD

CROSS-REFERENCE TO RELATED APPLICATIONS

This application is a National Stage of International Application No. PCT/JP2021/022467 filed Jun. 14, 2021, which claims priority to Japanese Patent Application No. 2020-109130 filed Jun. 24, 2020, the contents of each of the above-identified applications are incorporated herein by reference in their entirety.

TECHNICAL FIELD

The present disclosure generally relates to a resin composition, a prepreg, a film with resin, a sheet of metal foil with resin, a metal-clad laminate, and a printed wiring board. More particularly, the present disclosure relates to a resin composition containing a maleimide compound, and a prepreg, a film with resin, a sheet of metal foil with resin, a metal-clad laminate, and a printed wiring board, all of which use such a resin composition.

BACKGROUND ART

Patent Literature 1 discloses a resin film for manufacturing a highly multilayer printed wiring board. The resin film includes a compound including a maleimide group, a divalent group with at least two imide bonds, and a saturated or unsaturated divalent hydrocarbon group.

Patent Literature 1 teaches improving the flame retardance of the resin film by adding an inorganic filler thereto. However, Patent Literature 1 does not take the warpage of a board that uses such a resin film into account.

CITATION LIST

Patent Literature

Patent Literature 1: JP 2016-131243 A

SUMMARY OF INVENTION

An object of the present disclosure is to provide a resin composition, a prepreg, a film with resin, a sheet of metal foil with resin, a metal-clad laminate, and a printed wiring board, all of which contribute to manufacturing a board while reducing its warpage and improving its flame resistance at the same time.

A resin composition according to an aspect of the present disclosure contains a maleimide compound (A) and a phosphorus-containing compound (B). The maleimide compound (A) includes a first maleimide compound (A1) having an alkyl group, of which a carbon number is equal to or greater than six, and/or an alkylene group, of which a carbon number is equal to or greater than six. The phosphorus-containing compound (B) includes a phosphorus-containing compound (B1) having a structure expressed by the following formula (b1):

(b1)

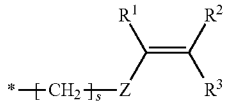

where s indicates an integer falling within the range from 1 to 10, Z indicates either an arylene group or an ester bond expressed by the following formula (b1.1), $R^1$ to $R^3$ each independently indicate either a hydrogen atom or a monovalent organic group, and * indicates a bond:

(b1.1)

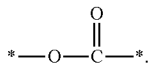

A prepreg according to another aspect of the present disclosure includes: a base member; and a resin layer containing either the resin composition described above or a semi-cured product of the resin composition, each of which is impregnated into the base member.

A film with resin according to still another aspect of the present disclosure includes: a resin layer containing either the resin composition described above or a semi-cured product of the resin composition; and a supporting film supporting the resin layer.

A sheet of metal foil with resin according to yet another aspect of the present disclosure includes: a resin layer containing either the resin composition described above or a semi-cured product of the resin composition; and a sheet of metal foil bonded to the resin layer.

A metal-clad laminate according to yet another aspect of the present disclosure includes: an insulating layer containing either a cured product of the resin composition described above or a cured product of the prepreg described above; and a metal layer bonded to the insulating layer.

A printed wiring board according to yet another aspect of the present disclosure includes: an insulating layer containing either a cured product of the resin composition described above or a cured product of the prepreg described above; and conductor wiring formed on the insulating layer.

DESCRIPTION OF EMBODIMENTS

1. Overview

Figure 1:
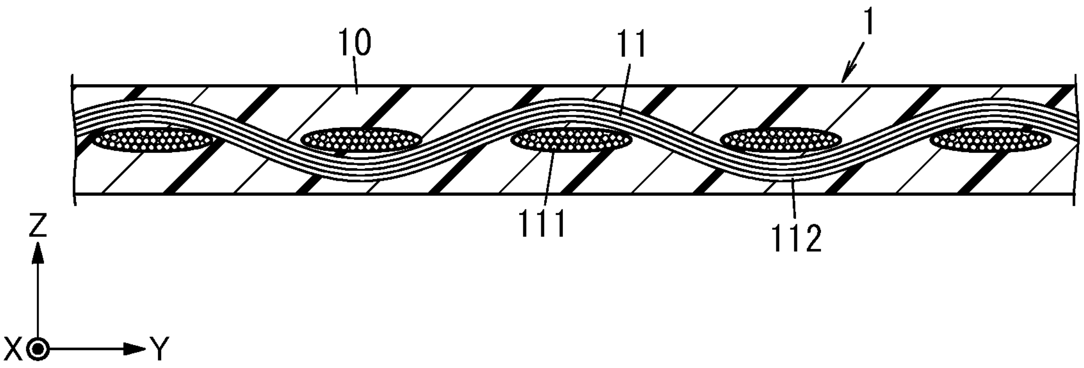
FIG. 1 is a schematic cross-sectional view illustrating a prepreg according to an exemplary embodiment of the present disclosure.

A resin composition according to an exemplary embodiment may be used as a board material. Examples of applications of the board material may include, without limitation, a prepreg 1, a film 2 with resin, a sheet of metal foil 3 with resin, a metal-clad laminate 4, and a printed wiring board 5 (see FIGS. 1-6B).

The present inventors discovered that there is a correlation between the warpage of a board and the loss tangent (tan δ) of the board. Plainly speaking, the present inventors discovered that the warpage of the board could be reduced by increasing the loss tangent (tan δ) of the board. The present inventors further carried out research and development to find a material that would effectively contribute to increasing the loss tangent (tan δ) of the board.

Specifically, a resin composition according to this embodiment contains a maleimide compound (A) and a phosphorus-containing compound (B).

The maleimide compound (A) includes a first maleimide compound (A1) having an alkyl group, of which the carbon number is equal to or greater than six, and/or an alkylene group, of which the carbon number is equal to or greater than six. As can be seen, the first maleimide compound (A1) has as long a chain as C6 or more and is likely to increase the loss tangent (tan δ) of the board.

On the other hand, the phosphorus-containing compound (B) includes a phosphorus-containing compound (B1) having a structure expressed by the following formula (b1). As can be seen, the phosphorus-containing compound (B1) contains phosphorus, and therefore, may be used as a material for a flame retardant. Flame retardants are classifiable into reactive flame retardants and additive flame retardants. A reactive flame retardant herein refers to a flame retardant which chemically bonds to another component through chemical reaction. On the other hand, the additive flame retardant herein refers to a flame retardant other than the reactive flame retardants. In other words, the additive flame retardant is just added without forming any chemical bond to any other component. The phosphorus-containing compound (B1) has an ethenylbenzyl group, and therefore, is a type of reactive flame retardant. That is to say, the phosphorus-containing compound (B1) may react with the first maleimide compound (A1) due to the presence of the ethenylbenzyl group. This may check a decline in the crosslinking density even if the first maleimide compound (A1) has as long a chain as C6 or more. In addition, the phosphorus-containing compound (B1) contains phosphorus, and therefore, is halogen-free and may also improve the flame resistance of the board.

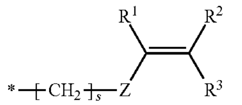

(b1)

where s indicates an integer falling within the range from 1 to 10, Z indicates either an arylene group or an ester bond expressed by the following formula (b1.1), $R^1$ to $R^3$ each independently indicate either a hydrogen atom or a monovalent organic group, and * indicates a bond:

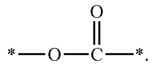

(b1.1)

Thus, the resin composition according to this embodiment enables manufacturing a board while reducing its warpage and improving its flame resistance at the same time.

2. Details

Next, a resin composition according to this embodiment will be described in detail. After that, a prepreg 1, a film 2 with resin, a sheet of metal foil 3 with resin, a metal-clad laminate 4, a printed wiring board 5, and a semiconductor package 100 according to this embodiment will be described in detail with reference to the accompanying drawings. In some of the drawings, arrows indicating X, Y, and Z directions, which intersect at right angles with each other, are shown for the sake of convenience of description. Note that those arrows are insubstantial ones.

(1) Resin Composition

A resin composition according to this embodiment contains a maleimide compound (A) and a phosphorus-containing compound (B). The resin composition preferably further contains a non-hydrogenated product of a styrene copolymer (C) and/or a hydrogenated product thereof. The resin composition preferably further contains a resin component (D). The resin component (D) is a resin component other than the maleimide compound (A), the phosphorus-containing compound (B), and the styrene copolymer (C). The resin composition preferably further contains an inorganic filler (E). The resin composition may further contain other components (F). Among these components, the maleimide compound (A) and the phosphorus-containing compound (B) are essential components, while the styrene copolymer (C), the resin component (D), the inorganic filler (E), and the other components (F) are optional components. These constituent components of the resin composition will be described one by one.

<Maleimide Compound (A)>

The maleimide compound (A) includes a first maleimide compound (A1). The first maleimide compound (A1) has an alkyl group, of which the carbon number is equal to or greater than six, and/or an alkylene group, of which the carbon number is equal to or greater than six. In other words, the first maleimide compound (A1) includes at least one of the alkyl group, of which the carbon number is equal to or greater than six, or the alkylene group, of which the carbon number is equal to or greater than six. The upper limit value of the carbon number of the alkyl group is not limited to any particular value but may be 100, for example. The upper limit value of the carbon number of the alkylene group is not limited to any particular value but may be 100, for example. As can be seen, the first maleimide compound (A1) has as long a chain as C6 or more, and therefore, is likely to increase the loss tangent (tan δ) of the board.

In this case, the loss tangent (tan δ) is also called a "loss factor" and is given by tan δ=E"/E', where E" is the loss modulus of elasticity and E' is the storage modulus of elasticity. The loss tangent (tan δ) of the board may be measured by a dynamic mechanical analyzer.

The maleimide compound (A) preferably includes at least one selected from the group consisting of a third maleimide compound (A3) expressed by the following formula (a3), a fourth maleimide compound (A4) expressed by the following formula (a4), and a fifth maleimide compound (A5) expressed by the following formula (a5). Adding such a maleimide compound (A) to the resin composition enables increasing the loss tangent (tan δ) of the board:

(a3)

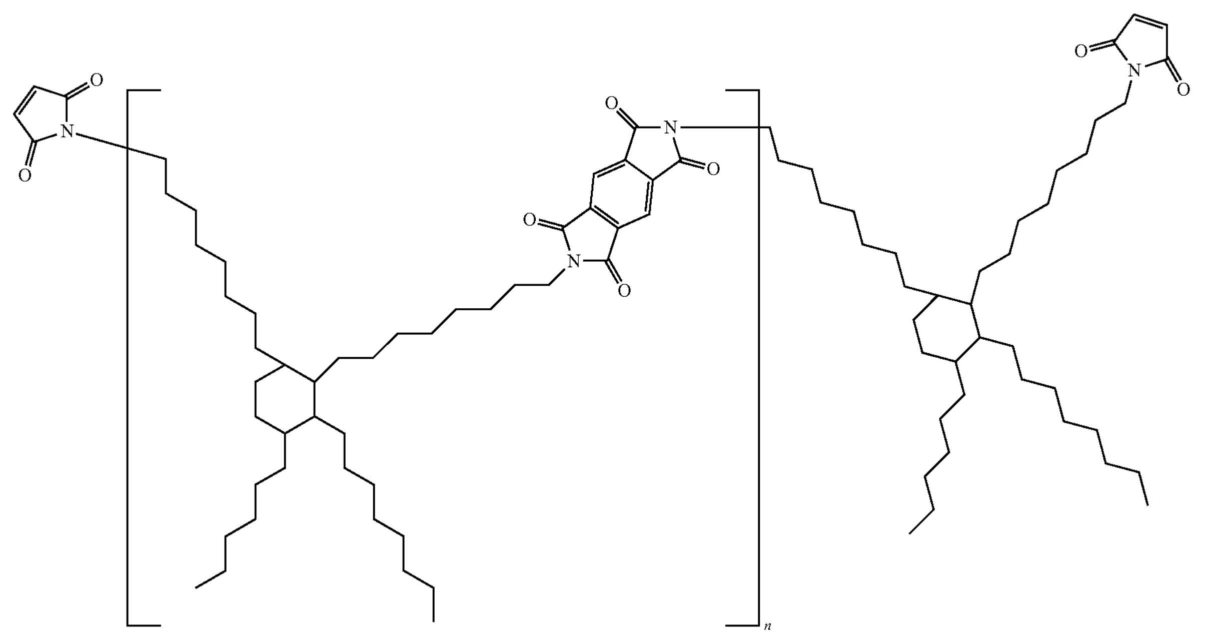

where n is an integer falling within the range from 1 to 10.

(a4)

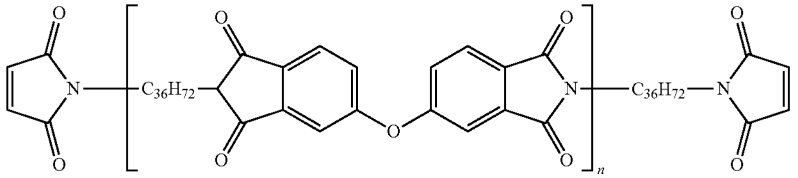

where n is an integer falling within the range from 1 to 10.

(a5)

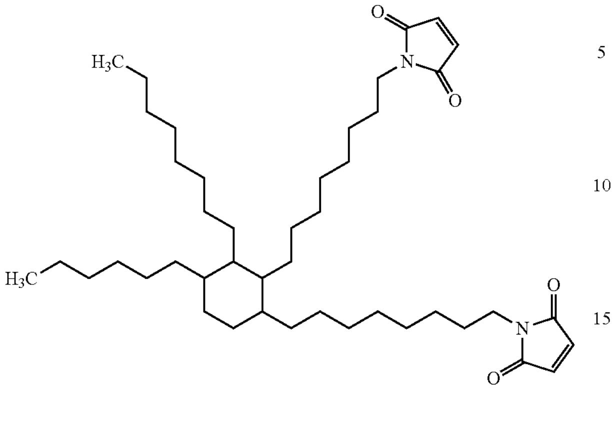

The first maleimide compound (A1) preferably has a maleimide group equivalent equal to or greater than 400 g/eq. This enables further reducing the warpage of the board. The upper limit value of the maleimide group equivalent is preferably equal to or less than 3000 g/eq and more preferably equal to or less than 2000 g/eq. Note that the maleimide group equivalent is a numerical value calculated by dividing the molecular weight of the maleimide compound (A) by the number of maleimide groups that the maleimide compound (A) has. That is to say, the maleimide group equivalent is a molecular weight per maleimide group.

The maleimide compound (A) preferably further includes a second maleimide compound (A2) having a maleimide group equivalent less than 400 g/eq. This enables increasing the glass transition temperature (Tg) of the board. Increasing Tg of the board may reduce the chances of causing cracks in the board and may increase the reliability of interlevel connection. That is to say, this may reduce the chances of causing cracks in a board such as a multilayer printed wiring board even if stress is applied to the board in a thermal shock test, for example, thus reducing an increase in the resistance value of via holes and through holes. This may increase the reliability of interlevel connection. In recent years, in particular, as the wiring has been laid out more and more densely with its feature size further reduced, the diameters of the via holes and through holes have been further decreased. Therefore, it is effective to increase Tg of the board to deal with circumstances such as these. The lower limit value of the maleimide group equivalent of the second maleimide compound (A2) is preferably equal to or greater than 150 g/eq and more preferably equal to or greater than 200 g/eq.

The second maleimide compound (A2) may, but does not have to, include a sixth maleimide compound (A6) expressed by the following formula (a6), for example. The sixth maleimide compound (A6) is 3,3'-dimethyl-5,5'-diethyl-4,4'-diphenylmethane bismaleimide.

(a6)

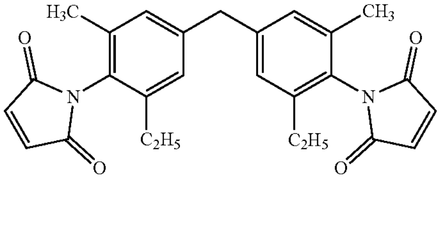

If the maleimide compound (A) further includes the second maleimide compound (A2), the content of the second maleimide compound (A2) with respect to the entire mass of the maleimide compound (A) is preferably equal to or greater than 10% by mass and equal to or less than 65% by mass.

The content of the maleimide compound (A) is preferably equal to or greater than 20 parts by mass and equal to or less than 50 parts by mass with respect to 100 parts by mass in total of the maleimide compound (A), the styrene copolymer (C), and the resin component (D). This may further reduce the warpage of the board. Note that in that case, the resin composition may contain no styrene copolymer (C) or resin component (D).

<Phosphorus-Containing Compound (B)>

The phosphorus-containing compound (B) includes a phosphorus-containing compound (B1) having a structure expressed by the following formula (b1). As can be seen, the phosphorus-containing compound (B1) not only contains phosphorus but also includes an ethenylbenzyl group, and therefore, is a type of reactive flame retardant.

Furthermore, the phosphorus-containing compound (B1) contains phosphorus, and therefore, contributes to improving the flame resistance (in particular, self-extinguishing property) of the board. That is to say, the phosphorus-containing compound (B1) may impart flame resistance to the board by making a coating of a phosphoric acid layer produced by thermal decomposition form not only an oxygen cutoff layer but also a carbon coating on the resin surface due to dehydration action and thereby cutting off oxygen and heat.

Furthermore, the cured product of the resin composition according to this embodiment may come into contact with various chemicals during the manufacturing process of the printed wiring board but is stable enough with respect to these chemicals. Specifically, the phosphorus-containing compound (B) is not an additive flame retardant but a reactive flame retardant, and therefore, is introduced into a resin skeleton including the first maleimide compound (A1). That is to say, the phosphorus-containing compound (B1) forms a bond with the resin skeleton and may form part of the resin skeleton. This may reduce, even if the cured product of the resin composition is in contact with various chemicals, elution of phosphorus from the cured product. This may improve the chemical resistance of the cured product. Therefore, the phosphorus supported by the cured product may contribute to maintaining the flame resistance of the board.

(b1)

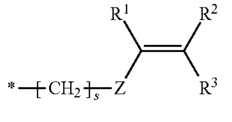

where s indicates an integer falling within the range from 1 to 10, Z indicates either an arylene group or an ester bond expressed by the following formula (b1.1), $R^1$ to $R^3$ each independently indicate either a hydrogen atom or a monovalent organic group, and * indicates a bond:

(b1.1)

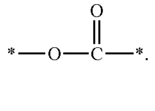

The monovalent organic group may be, but does not have to be, an alkyl group, for example. The alkyl group may be, but does not have to be, a methyl group, for example.

The structure expressed by the formula (b1) is preferably a structure expressed by either the following formula (b2.1) or the following formula (b2.2). This may further improve the chemical resistance.

(b2.1)

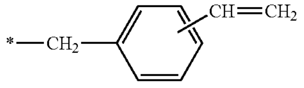

(b2.2)

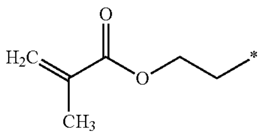

In these formulae (b2.1) and (b2.2), * indicates a bond.

The phosphorus-containing compound (B1) preferably further has a structure expressed by either the following formula (b3.1) or the following formula (b3.2). This may further improve the chemical resistance.

(b3.1)

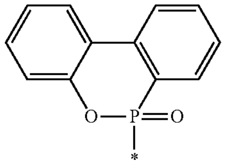

(b3.2)

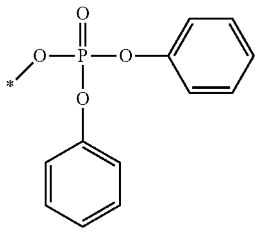

In these formulae (b3.1) and (b3.2), * indicates a bond.

The phosphorus-containing compound (B1) preferably has both the structure expressed by either the formula (b2.1) or the formula (b2.2) and the structure expressed by either the formula (b3.1) or the formula (b3.2). The phosphorus-containing compound (B1) preferably includes a phosphorus-containing compound (B4) expressed by the following formula (b4). The phosphorus-containing compound (B4) is diphenyl-2-methacryloyloxyethyl phosphate.

(b4)

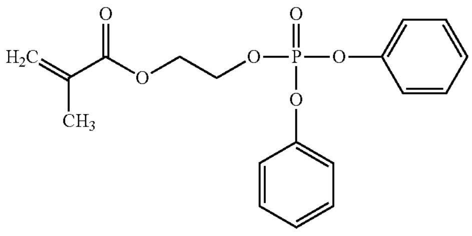

The phosphorus content of the phosphorus-containing compound (B) is preferably equal to or greater than 7% by mass with respect to the entire mass of the phosphorus-containing compound (B). This may further improve the flame resistance. The upper limit value of the phosphorus content of the phosphorus-containing compound (B) may be, but does not have to be, equal to or less than 10% by mass, for example.

The content of the phosphorus-containing compound (B) is preferably equal to or greater than 10% by mass and equal to or less than 60% by mass, more preferably equal to or greater than 20% by mass and equal to or less than 60% by mass, and even more preferably equal to or greater than 30% by mass and equal to or less than 55% by mass, with respect to the total mass of the maleimide compound (A) and the phosphorus-containing compound (B).

<Styrene Copolymer (C)>

The resin composition preferably further contains a non-hydrogenated product of a styrene copolymer (C) and/or a hydrogenated product thereof.

The styrene copolymer (C) has at least one type of structure derived from a styrene compound and/or a styrene derivative. Examples of the styrene compound and/or styrene derivative include, without limitation, styrene, α-methyl styrene, p-methyl styrene, a compound in which some of hydrogen atoms of these aromatic rings are replaced with an alkyl group, and polymers thereof. The styrene copolymer (C) may further have a structure derived from a conjugated diene-based compound.

The non-hydrogenated product of the styrene copolymer (C) herein refers to a non-hydrogenated substance. The hydrogenated product of the styrene copolymer (C) herein refers to a hydrogenated substance. The weight average molecular weight of the styrene copolymer (C) is preferably equal to or greater than 10,000 and equal to or less than 150,000. Adding such a styrene copolymer (C) to the resin composition enables further reducing the warpage of the board. Making the weight average molecular weight of the styrene copolymer (C) equal to or greater than 10,000 may check a decline in the desmear resistance. A method for evaluating the desmear resistance will be described later in the Examples section. On the other hand, making the weight average molecular weight of the styrene copolymer (C) equal to or less than 150,000 may check a decline in flame resistance.

The styrene copolymer (C) preferably includes at least one selected from the group consisting of: a methylstyrene (ethylene/butylene) methylstyrene copolymer; a methylstyrene (ethylene-ethylene/propylene) methylstyrene copolymer; a styrene-isoprene copolymer; a styrene-isoprene-styrene copolymer; a styrene (ethylene/butylene) styrene copolymer; a styrene (ethylene-ethylene/propylene) styrene copolymer; and hydrogenated products thereof. Adding such a styrene copolymer (C) to the resin composition enables further reducing the warpage of the board.

If the resin composition further contains the styrene copolymer (C), the content of the styrene copolymer (C) is preferably equal to or greater than 15% by mass and equal to or less than 35% by mass with respect to the total mass of the maleimide compound (A), the phosphorus-containing compound (B), and the styrene copolymer (C).

If the resin composition further contains the styrene copolymer (C), the content of the styrene copolymer (C) is preferably equal to or greater than 10 parts by mass and equal to or less than 40 parts by mass with respect to 100 parts by mass in total of the maleimide compound (A), the styrene copolymer (C), and the resin component (D). This enables further reducing the warpage of the board. Note that in that case, the resin composition may contain no resin component (D).

<Resin Component (D)>

The resin composition preferably further contains a resin component (D). The resin component (D) herein refers to resin components other than the maleimide compound (A), the phosphorus-containing compound (B), and the styrene copolymer (C).

The resin component (D) preferably includes at least one selected from the group consisting of: epoxy compounds; phenolic compounds; polyphenylene ether compounds; modified polyphenylene ether compounds each having a reactive unsaturated group; benzoxazine compounds; radically polymerizable compounds each having a polymerizable unsaturated group; cyanate ester compounds; and amine compounds. This may impart a property unique to each of the resin components (D) to the resin composition. For example, this may improve the desmear resistance and the electrical characteristics.

The epoxy compound herein refers to a compound having at least one epoxy group (preferably two or more epoxy groups) per molecule. Examples of the epoxy compounds include, without limitation, naphthalene epoxy resins, biphenyl epoxy resins, dicyclopentadiene epoxy resins, and mesogen skeleton epoxy resins. The mesogen skeleton epoxy resin is an epoxy resin having at least one mesogen group per molecule. As used herein, the mesogen group has a rigid structure and is the smallest unit structure that may form a liquid crystal structure. Examples of the mesogen group include, without limitation, a biphenyl structure and a phenylbenzoate structure.

The epoxy compound preferably has an epoxy equivalent equal to or greater than 200 g/eq and equal to or less than 350 g/eq. This enables increasing the glass transition temperature (Tg) of the board. As described above, increasing Tg of the board may reduce the chances of causing cracks in the board and may increase the reliability of interlevel connection.

The phenolic compound is a compound produced by polymerizing a phenol and formaldehyde with an acidic catalyst or a basic catalyst. The phenolic compound may be, but does not have to be, phenol novolac, for example.

If the resin composition further contains the resin component (D), the content of the resin component (D) is preferably equal to or greater than 1 part by mass and equal to or less than 40 parts by mass and more preferably equal to or greater than 5 parts by mass and equal to or less than 30 parts by mass with respect to 100 parts by mass in total of the maleimide compound (A), the phosphorus-containing compound (B), and the styrene copolymer (C). Note that in that case, the resin composition may contain no styrene copolymer (C).

<Inorganic Filler (E)>

The resin composition preferably further contains an inorganic filler (E). This may reduce the linear expansivity of the board.

The inorganic filler (E) preferably contains at least one selected from the group consisting of metal oxides, metal hydroxides, talc, aluminum borate, barium sulfate, calcium carbonate, and zinc molybdate. Examples of the metal oxides include, without limitation, silica, alumina, titanium oxide, and mica. Examples of the metal hydroxides include, without limitation, aluminum hydroxide and magnesium hydroxide.

The inorganic filler (E) is preferably surface-treated with a surface treatment agent. This improves the wettability of the inorganic filler (E) with the maleimide compound (A), the phosphorus-containing compound (B), the styrene copolymer (C), and the resin component (D) and thereby improves the dispersibility of the inorganic filler (E). Examples of the surface treatment agents include, without limitation, silane coupling agents, titanate coupling agents, aliphatic acid, and surfactants. The silane coupling agent preferably includes at least one functional group selected from the group consisting of a vinyl group, an epoxy group, a styryl group, a methacrylic group, an acrylic group, an amino group, an isocyanurate group, a ureido group, a mercapto group, an isocyanate group, and an acid anhydride group.

The inorganic filler (E) preferably has a spherical shape. This may increase the flowability of the resin composition during the molding process.

The mean particle size of the inorganic filler (E) is preferably equal to or greater than 0.01 μm and equal to or less than 50 μm and more preferably equal to or greater than 0.05 μm and equal to or less than 20 μm. Note that the mean particle size herein refers to a particle size at an integrated value of 50% in a particle size distribution obtained by laser diffraction and scattering method.

If the resin composition further contains the inorganic filler (E), the content of the inorganic filler (E) is preferably equal to or greater than 20 parts by mass and equal to or less than 200 parts by mass, and more preferably equal to or greater than 50 parts by mass and equal to or less than 150 parts by mass, with respect to 100 parts by mass in total of the maleimide compound (A), the phosphorus-containing compound (B), the styrene copolymer (C), and the resin component (D). Note that in that case, the resin composition may contain no styrene copolymer (C) or resin component (D).

<Other Components (F)>

The resin composition may further contain other components (F). Examples of the other components (F) include, without limitation, catalytic curing agents, cross-linking agents, reaction initiators, resin modifiers, antifoaming agents, heat stabilizers, antistatic agents, ultraviolet absorbers, dyes, pigments, lubricants, dispersants such as a wet dispersant, and leveling agents. The catalytic curing agents include an imidazole compound such as 2-ethyl-4-methylimidazole. The reaction initiators include organic peroxides such as α, α'-di (t-butylperoxy) diisopropyl benzene. The content of the other components (F) is not limited to any particular value unless the advantages of this embodiment are reduced.

<Form>

The resin composition may have any form without limitation. That is to say, the resin composition may be in liquid form or in solid form, whichever is appropriate. The liquid form includes a varnish form. A varnish may be prepared by mixing the resin composition with a solvent and stirring up the mixture. Examples of the solvents include, without limitation, toluene, methyl ethyl ketone, cyclohexanone, and propylene glycol monomethyl ether acetate.

(2) Prepreg

FIG. 1 illustrates a prepreg 1 according to this embodiment. The prepreg 1 has the shape of a sheet or a film as a whole. That is to say, the prepreg 1 extends in the X direction and the Y direction. The prepreg 1 may be used, for example, as a material for the metal-clad laminate 4, as a material for the printed wiring board 5, and to make a printed wiring board 5 with multiple levels (by buildup process). When heated or irradiated with light (e.g., an ultraviolet ray), the prepreg 1 is cured to turn into a cured product. The cured product of the prepreg 1 may form an insulating layer 40 of the metal-clad laminate 4 or an insulating layer 50 of the printed wiring board 5 (see FIGS. 5-6B).

The prepreg 1 includes: a base member 11; and a resin layer 10 containing either a resin composition or a semi-cured product of the resin composition, each of which is impregnated into the base member 11. A sheet of the prepreg 1 includes at least one base member 11.

A material for the base member 11 is not limited to any particular one but may be, for example, a woven fabric or a nonwoven fabric.

Examples of the woven fabric include, without limitation, glass cloth, aramid cloth, and polyester cloth.

Examples of the nonwoven fabric include, without limitation, glass nonwoven fabric, aramid nonwoven fabric, polyester nonwoven fabric, pulp paper, and linter paper.

Examples of the glass fiber as a constituent material for the glass cloth and the glass nonwoven fabric include, without limitation, Q glass, NE glass, E glass, S glass, T glass, L glass, and L2 glass.

The base member 11 preferably has a thickness equal to or greater than 5 μm and equal to or less than 300 μm and more preferably has a thickness equal to or greater than 10 μm and equal to or less than 200 μm.

The surface of the base member 11 may be subjected to surface treatment with a silane coupling agent. The silane coupling agent may be, but does not have to be, a silane coupling agent having at least one functional group selected from the group consisting of, for example, a vinyl group, an epoxy group, a styryl group, a methacrylic group, an acrylic group, an amino group, an isocyanurate group, a ureido group, a mercapto group, an isocyanate group, and an acid anhydride group.

Figure 2:
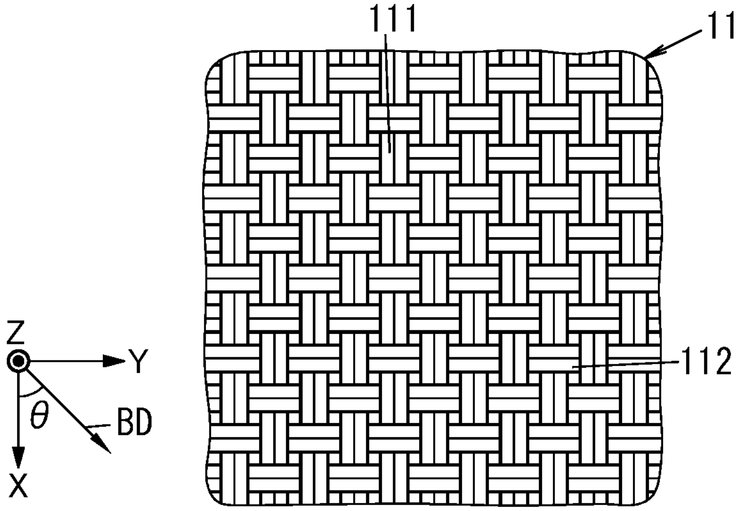
FIG. 2 is a schematic plan view illustrating a base member for use in the prepreg.

FIG. 2 illustrates an exemplary base member 11. The base member 11 is a piece of woven fabric in which a warp 111 and a woof 112 are woven. The direction (X direction) of the warp 111 and the direction (Y direction) of the woof 112 intersect with each other at right angles. The base member 11 extends in the X direction and the Y direction. A biasing direction BD is a direction intersecting with the direction (X direction) of the warp 111. The angle formed between the biasing direction BD and the direction (X direction) of the warp 111 is θ (which may be 45 degrees, for example).

The resin layer 10 may be either a resin layer containing a resin composition (in a first case) or a resin layer containing a semi-cured product of the resin composition (in a second case).

In the first case, the resin layer 10 may be formed in the following manner. Specifically, the resin layer 10 may be formed by impregnating a varnish of the resin composition into the base member 11 and then vaporizing the solvent. This resin layer 10 is formed as an unreacted resin composition (which is a dried product thereof). As used herein, the "unreacted state" includes a completely unreacted state and a hardly unreacted state. When heated, the resin layer 10 turns from the unreacted state into a cured state.

On the other hand, in the second case, the resin composition is in a semi-cured state. As used herein, the "semi-cured state" refers to an intermediate stage (Stage B) of a curing reaction. The intermediate stage is a stage between Stage A in the state of a varnish and Stage C in a fully cured state. In the second case, the resin layer 10 may be formed in the following manner. Specifically, the resin layer 10 may be formed by impregnating the base member 11 with a varnish of the resin composition, heating the base member 11 to vaporize the solvent, and advancing the curing reaction of the resin composition to the intermediate stage. This resin layer 10 is made of the resin composition in the semi-cured state (i.e., a semi-cured product of the resin composition).

As can be seen from the foregoing description, the degree of advancement of the curing reaction of the resin layer 10 varies according to the resin composition to use.

The thickness (i.e., thickness measured in the Z direction) of the prepreg 1 may be, but does not have to be, equal to or greater than 10 μm and equal to or less than 120 μm. This may achieve the advantage of reducing the thickness of the board.

As can be seen, the resin layer 10 of the prepreg 1 according to this embodiment is made of the resin composition described above, thus enabling manufacturing a board while reducing its warpage and improving its flame resistance at the same time.

(3) Film With Resin

Figure 3A:
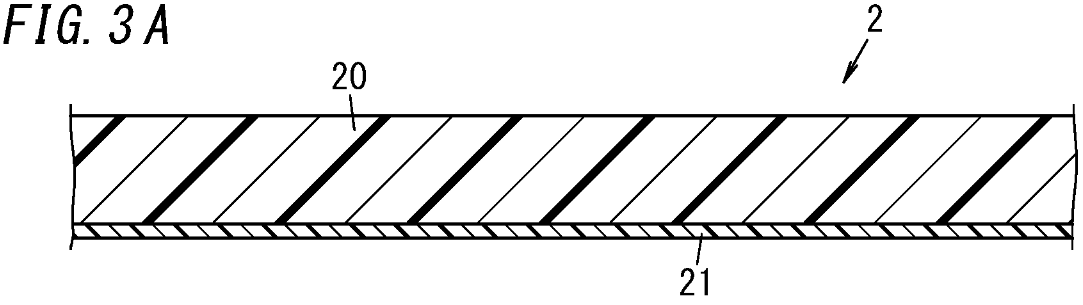
FIG. 3A is a schematic cross-sectional view illustrating a film with resin (and without a protective film) according to the exemplary embodiment of the present disclosure.

FIG. 3A illustrates a film 2 with resin according to this embodiment. The film 2 with resin has the shape of a film or sheet as a whole. The film 2 with resin includes: a resin layer 20 containing the resin composition or a semi-cured product of the resin composition; and a supporting film 21 that supports the resin layer 20. The film 2 with resin may be used, for example, to form a printed wiring board 5 with multiple levels (by buildup process).

Figure 5:
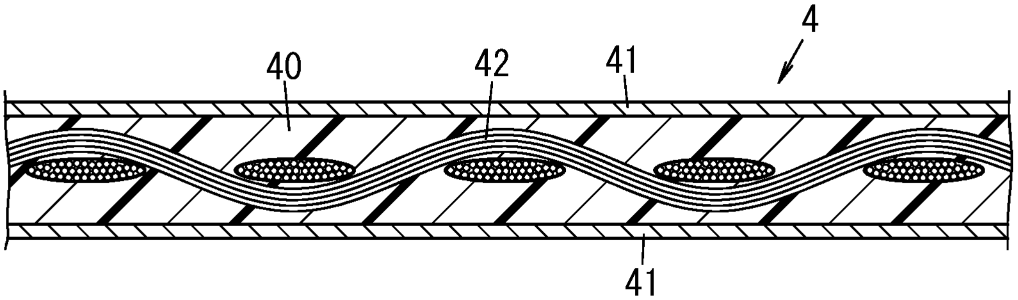
FIG. 5 is a schematic cross-sectional view illustrating a metal-clad laminate according to the exemplary embodiment of the present disclosure.
Figure 6A:
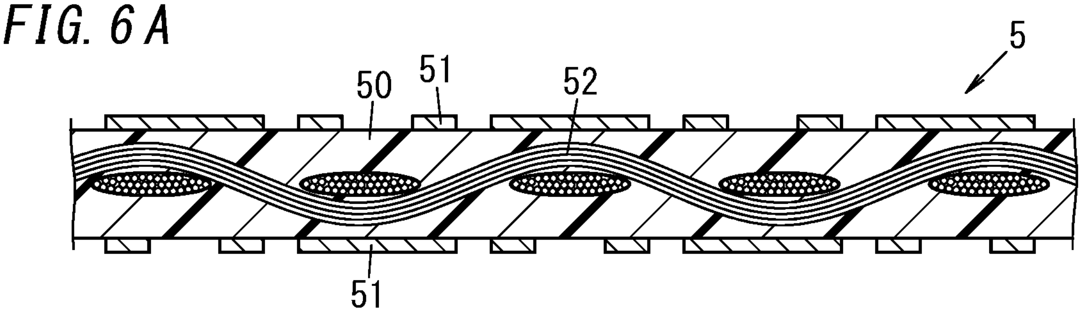
FIG. 6A is a schematic cross-sectional view illustrating a printed wiring board (without interlevel connection) according to the exemplary embodiment of the present disclosure.
Figure 6B:
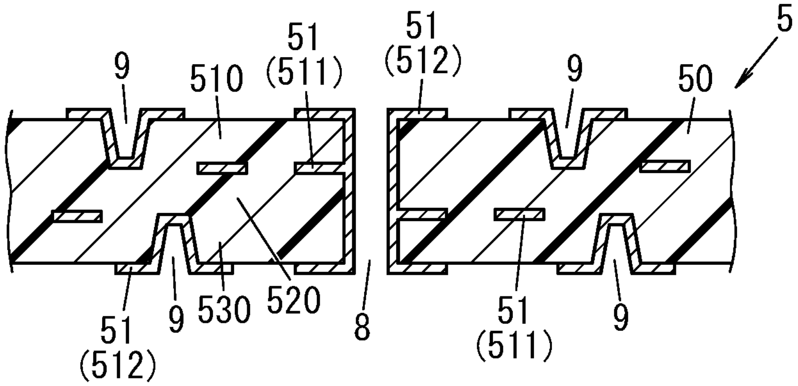
FIG. 6B is a schematic cross-sectional view illustrating a printed wiring board (with interlevel connection) according to the exemplary embodiment of the present disclosure.

When heated or irradiated with light (e.g., an ultraviolet ray), the resin layer 20 is cured to form the insulating layer 40 of the metal-clad laminate 4 or the insulating layer 50 of the printed wiring board 5 (see FIGS. 5-6B). The resin layer 20 is the same as the resin layer 10 of the prepreg 1 except that the resin layer 20 is not impregnated into the base member 11.

The thickness of the resin layer 20 is not limited to any particular value but may be, for example, equal to or greater than 10 μm and equal to or less than 120 μm. This enables reducing the thickness of the board.

The supporting film 21 supports the resin layer 20 thereon. Supporting the resin layer 20 in this way allows the resin layer 20 to be handled more easily. The supporting film 21 may be peeled off from the resin layer 20 as needed. After the resin layer 20 has been cured to form the insulating layer 40, the supporting film 21 is preferably peeled off from the insulating layer 40. The same statement applies to a situation where the insulating layer 50 is formed out of the resin layer 20.

The supporting film 21 may be, but does not have to be, an electrically insulating film, for example. Specific examples of the supporting film 21 include a polyethylene terephthalate (PET) film, a polyimide film, a polyester film, a polyparabanic acid film, a polyether ether ketone film, a polyphenylene sulfide film, an aramid film, a polycarbonate film, and a polyarylate film. However, these are only examples and the supporting film 21 does not have to be one of these films.

Figure 3B:
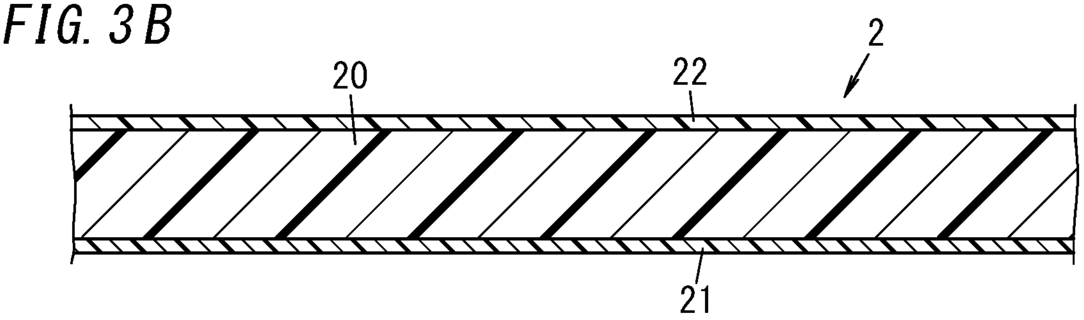
FIG. 3B is a schematic cross-sectional view illustrating a film with resin (and with a protective film) according to the exemplary embodiment of the present disclosure.

Although one surface of the resin layer 20 is covered with the supporting film 21 in the example shown in FIG. 3A, the other surface of the resin layer 20 may be covered with a protective film 22 with the one surface of the resin layer 20 covered with the supporting film 21 as shown in FIG. 3B. The protective film 22, as well as the supporting film 21, may also be peeled off from the resin layer 20 as needed. Covering both surfaces of the resin layer 20 in this manner allows the resin layer 20 to be handled even more easily. This also reduces the chances of foreign particles adhering onto the resin layer 20.

The protective film 22 may be, but does not have to be, an electrically insulating film, for example. Specific examples of the protective film 22 include a polyethylene terephthalate (PET) film, a polyolefin film, a polyester film, and a polymethylpentene film. However, these are only examples and the protective film 22 does not have to be one of these films.

As can be seen, the resin layer 20 of the film 2 with resin according to this embodiment is made of the resin composition described above, thus enabling manufacturing a board while reducing its warpage and improving its flame resistance at the same time.

(4) Sheet of Metal Foil With Resin

Figure 4:
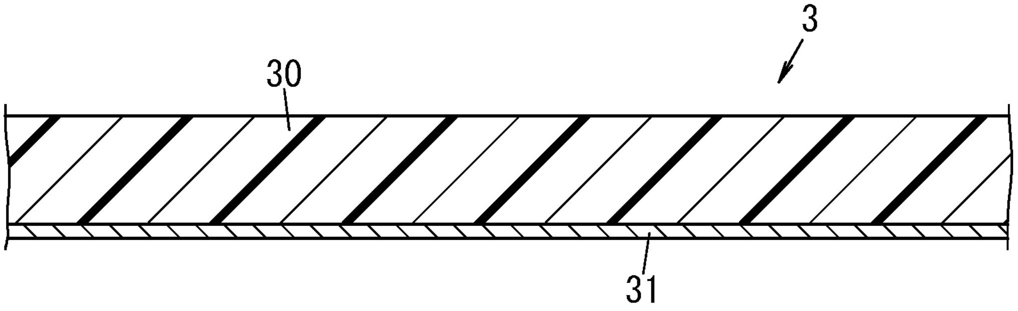
FIG. 4 is a schematic cross-sectional view illustrating a sheet of metal foil with resin according to the exemplary embodiment of the present disclosure.

FIG. 4 illustrates a sheet of metal foil 3 with resin according to this embodiment. The sheet of metal foil 3 with resin has the shape of a film or sheet as a whole. The sheet of metal foil 3 with resin includes: a resin layer 30 containing the resin composition or a semi-cured product of the resin composition; and a sheet of metal foil 31 bonded to the resin layer 30. The sheet of metal foil 3 with resin may be used, for example, to form a printed wiring board 5 with multiple levels (by buildup process).

When heated or irradiated with light (e.g., an ultraviolet ray), the resin layer 30 is cured to form the insulating layer 40 of the metal-clad laminate 4 or the insulating layer 50 of the printed wiring board 5 (see FIGS. 5-6B). The resin layer 30 is the same as the resin layer 10 of the prepreg 1 except that the resin layer 30 is not impregnated into the base member 11.

The thickness of the resin layer 30 is not limited to any particular value but may be, for example, equal to or greater than 10 μm and equal to or less than 120 μm. This enables reducing the thickness of the board.

The sheet of metal foil 31 is bonded onto the resin layer 30. The sheet of metal foil 31 may specifically be, but does not have to be, a sheet of copper foil, a sheet of aluminum foil, or a sheet of nickel foil. The sheet of metal foil 31 may be patterned into conductor wiring 51 by having unnecessary portions thereof etched away by subtractive process, for example (see FIG. 6A, for example).

The thickness of the sheet of metal foil 31 is not limited to any particular value but is preferably equal to or greater than 0.2 μm and equal to or less than 35 μm, for example.

If the sheet of metal foil 31 is configured as an extremely thin sheet of metal foil, then the sheet of metal foil 31 preferably forms part of an extremely thin sheet of metal foil with a carrier from the viewpoint of improving its handleability. The extremely thin sheet of metal foil with the carrier includes the sheet of metal foil 31 (extremely thin sheet of metal foil), a peelable layer, and a carrier. In that case, the sheet of metal foil 31 has a thickness equal to or less than 10 μm, for example. The peelable layer is used to temporarily bond the sheet of metal foil 31 to the carrier. The sheet of metal foil 31 is peeled off as needed from either the peelable layer or the carrier. The carrier is a support for supporting the sheet of metal foil 31 thereon. Specific examples of the carrier include a sheet of copper foil and a sheet of aluminum foil. The carrier is thicker than the sheet of metal foil 31.

As can be seen, the resin layer 30 of the sheet of metal foil 3 with resin according to this embodiment is made of the resin composition described above, thus enabling manufacturing a board while reducing its warpage and improving its flame resistance at the same time.

(5) Metal-Clad Laminate

FIG. 5 illustrates a metal-clad laminate 4 according to this embodiment. The metal-clad laminate 4 includes an insulating layer 40 and metal layers 41 bonded to the insulating layer 40. The insulating layer 40 includes either a cured product of the resin composition or a cured product of the prepreg 1. The metal-clad laminate 4 may be used, for example, as a material for the printed wiring board 5.

Although the single insulating layer 40 includes a single base member 42 in the example illustrated in FIG. 5, the single insulating layer 40 may include two or more base members 42.

The thickness of the insulating layer 40 is not limited to any particular value but may be, for example, equal to or greater than 10 μm and equal to or less than 120 μm. This enables reducing the thickness of the board.

Although the metal layers 41 are respectively bonded to both surfaces of the insulating layer 40 in the example illustrated in FIG. 5, the metal layer 41 may be bonded to only one surface of the insulating layer 40. The metal-clad laminate 4 having the metal layers 41 respectively bonded to both surfaces of the insulating layer 40 is a double-sided metal-clad laminate. The metal-clad laminate 4 having the metal layer 41 bonded to only surface of the insulating layer 40 is a single-sided metal-clad laminate.

The metal layer 41 may be, but does not have to be, a sheet of metal foil, for example. The sheet of metal foil may be, but does not have to be, a sheet of copper foil, a sheet of aluminum foil, or a sheet of nickel foil, for example.

The thickness of the metal layer 41 is not limited to any particular value but may be, for example, equal to or greater than 0.2 μm and equal to or less than 35 μm. If the metal layer 41 is configured as an extremely thin sheet of metal foil, then the metal layer 41 preferably forms part of an extremely thin sheet of metal foil with a carrier from the viewpoint of improving its handleability. The extremely thin sheet of metal foil with a carrier is as described above.

As can be seen, the insulating layer 40 of the metal-clad laminate 4 according to this embodiment is made of the resin composition described above, thus enabling manufacturing a board while reducing its warpage and improving its flame resistance at the same time.

(6) Printed Wiring Board

FIGS. 6A and 6B illustrate printed wiring boards 5 according to this embodiment. Each of the printed wiring boards 5 includes an insulating layer 50 and conductor wiring 51 formed on the insulating layer 50. The insulating layer 50 includes either a cured product of the resin composition or a cured product of the prepreg 1.

The printed wiring board 5 shown in FIG. 6A includes a single insulating layer 50. In FIG. 6A, the single insulating layer 50 includes a single base member 52. However, this is only an example and should not be construed as limiting. Alternatively, the single insulating layer 50 may include two or more base members 52. On the other hand, the printed wiring board 5 shown in FIG. 6B includes a plurality of (specifically, three) insulating layers 50, namely, a first insulating layer 510, a second insulating layer 520, and a third insulating layer 530. These three insulating layers 50 are stacked in this order one on top of another in the thickness direction and are bonded to each other. In FIG. 6B, each of the first insulating layer 510, the second insulating layer 520 and the third insulating layer 530 may include no base member 52 or include one or more base members 52. As can be seen, the insulating layer 50 is the same as the insulating layer 40 of the metal-clad laminate 4 described above.

In the printed wiring board 5 shown in FIG. 6A, the conductor wiring 51 is formed on each of the two surfaces of the insulating layer 50. Alternatively, the conductor wiring 51 may be formed on only one surface of the insulating layer 50.

On the other hand, in the printed wiring board 5 shown in FIG. 6B, the conductor wiring 51 includes an internal circuit 511 and an external circuit 512. The internal circuit 511 is located between two insulating layers 50. Specifically, the internal circuit 511 is located between the first insulating layer 510 and the second insulating layer 520 and between the second insulating layer 520 and the third insulating layer 530. The external circuit 512 is located outside of the insulating layer 50. That is to say, the external circuit 512 is formed on the surface of the first insulating layer 510 and on the surface of the third insulating layer 530. The printed wiring board 5 shown in FIG. 6B further includes a via hole 8 and blind via holes 9. The via hole 8 and the blind via holes 8 electrically connect the internal circuit 511 and the external circuit 512 to each other. That is to say, the internal circuit 511 and the external circuit 512 are interconnected via the via hole 8 and the blind via holes 9.

The conductor wiring 51 may be, but does not have to be, formed by, for example, subtractive process or semi-additive process (SAP).

In the following description, an SAP which may be used to form the blind via holes 9 will be described with reference to FIGS. 7A-7G.

Figure 7A:
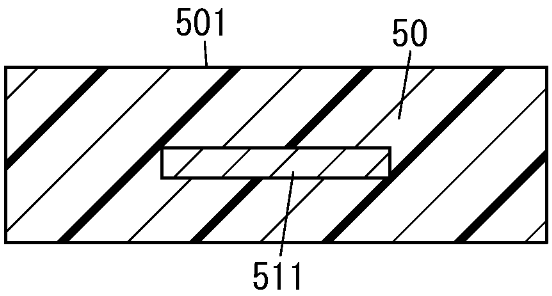
FIGS. 7A-7G are schematic cross-sectional views illustrating a series of process steps of a semi-additive process.

FIG. 7A illustrates an insulating layer 50 including the internal circuit 511 inside and having a principal surface 501 outside.

Figure 7B:
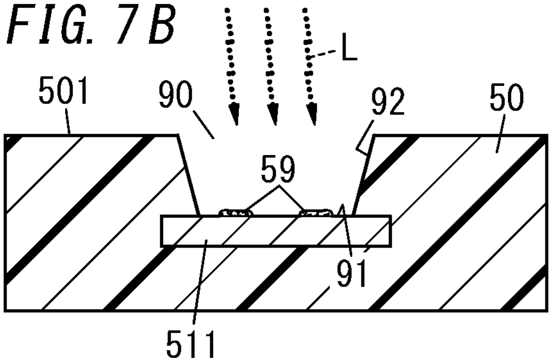

First of all, a non-through hole 90 is formed by cutting a hole halfway through the insulating layer 50 as shown in FIG. 7B. The hole may be cut by laser machining, for example. Specific examples of the laser beam L include a $CO_2$ laser beam and a UV-YAG laser beam. The non-through hole 90 is cut open through the principal surface 501 of the insulating layer 50. The bottom 91 of the non-through hole 90 is the surface of the internal circuit 511. While the hole is being cut, resin smears 59 are produced and adhere onto the surface of the internal circuit 511 that is the bottom 91 of the non-through hole 90.

Figure 7C:
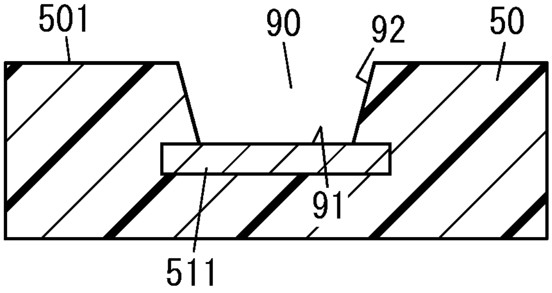

Next, to remove the resin smears 59, a desmear process is carried out as shown in FIG. 7C. The desmear process makes the principal surface 501 of the insulating layer 50 and an inner side surface 92 and bottom 91 of the non-through hole 90 roughened, and also allows the resin smears 59 to be removed from the bottom 91 and inner side surface 92 of the non-through hole 90.

Figure 7D:
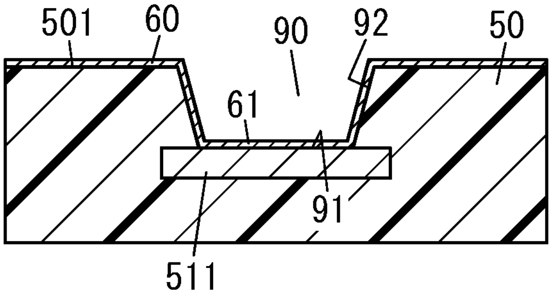

Thereafter, as shown in FIG. 7D, the principal surface 501 of the insulating layer 50 and the bottom 91 and inner side surface 92 of the non-through hole 90 are subjected to an electroless plating process, thereby forming an electroless plating layer 61 that will be a seed layer 60.

Figure 7E:
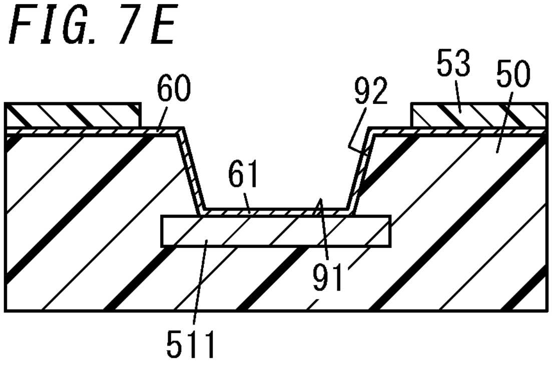
Figure 7F:
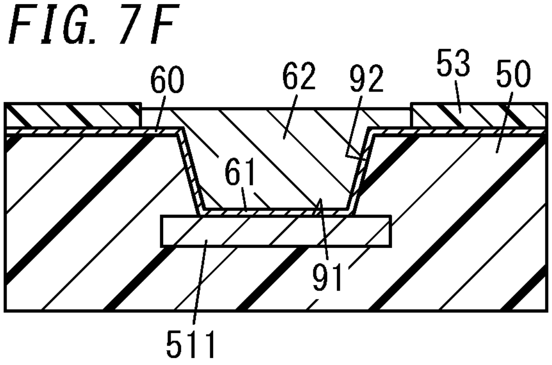

Subsequently, as shown in FIG. 7E, a plating resist mask 53 is formed on the principal surface 501 of the insulating layer 50. The plating resist mask 53 masks portions, which will not be covered with the external circuit 512, of the principal surface 501 of the insulating layer 50.

Then, as shown in FIG. 5F, an electroplating process is carried out to fill those portions, not masked with the plating resist mask 53, with a plating metal 62.

Figure 7G:
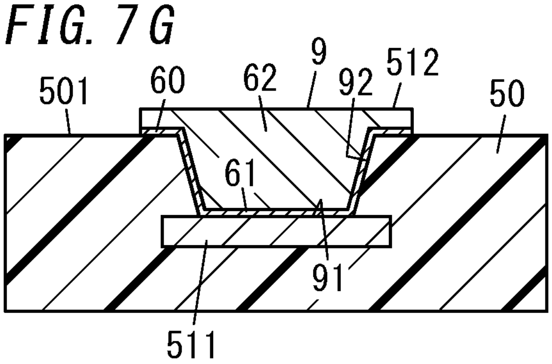

Thereafter, as shown in FIG. 7G, the plating resist mask 53 is removed and a portion, interposed between the plating resist mask 53 and the principal surface 501 of the insulating layer 50, of the seed layer 60 is etched away. In this manner, a blind via hole 9, which electrically connects the internal circuit 511 to the external circuit 512, is formed. In particular, the blind via hole 9 is filled with the plating metal 62, and therefore, is also called a "filled via."

Figure 8A:
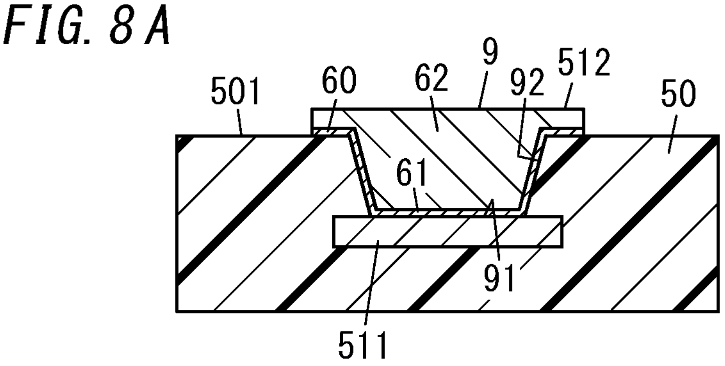
FIG. 8A is a schematic cross-sectional view illustrating a state where no resin smears are left between an internal circuit and plating after the semi-additive process has been performed.

In this embodiment, the insulating layer 50 contains the phosphorus-containing compound (B1) which is a type of reactive flame retardant. Thus, a filled via may be formed with no resin smears 59 left between the internal circuit 511 and the electroless plating layer 61 as shown in FIG. 8A after the SAP has been carried out. It would be even more effective if the insulating layer 50 contains the resin component (D). This would significantly reduce the chances of electrical conductivity being seriously affected by the resin smears 59, thus improving the reliability of electrical conduction. Note that the phrase "no resin smears 59 left" herein refers to not only a situation where literally no resin smears 59 are left at all but also a situation where very few resin smears 59 are left to the point of hardly affecting the reliability of electrical conduction.

Figure 8B:
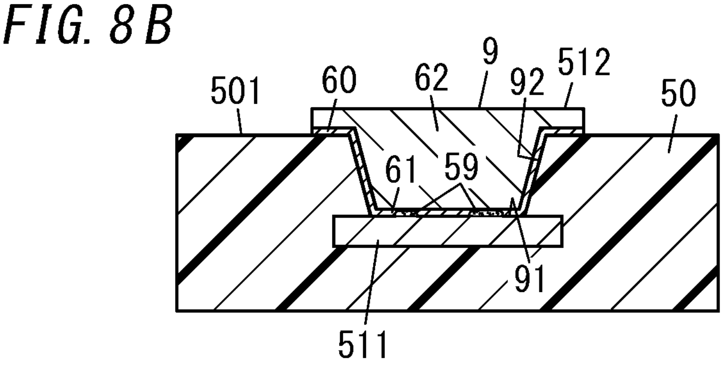
FIG. 8B is a schematic cross-sectional view illustrating a state where resin smears are left between the internal circuit and the plating after the semi-additive process has been performed.

On the other hand, if the insulating layer 50 contains an additive flame retardant instead of the phosphorus-containing compound (B1), a filled via may be formed with some resin smears 59 left between the internal circuit 511 and the electroless plating layer 61 as shown in FIG. 8B after the SAP has been carried out. These resin smears 59 are residual ones that have not been removed even by the desmear process.

(7) Semiconductor Package

Figure 9:
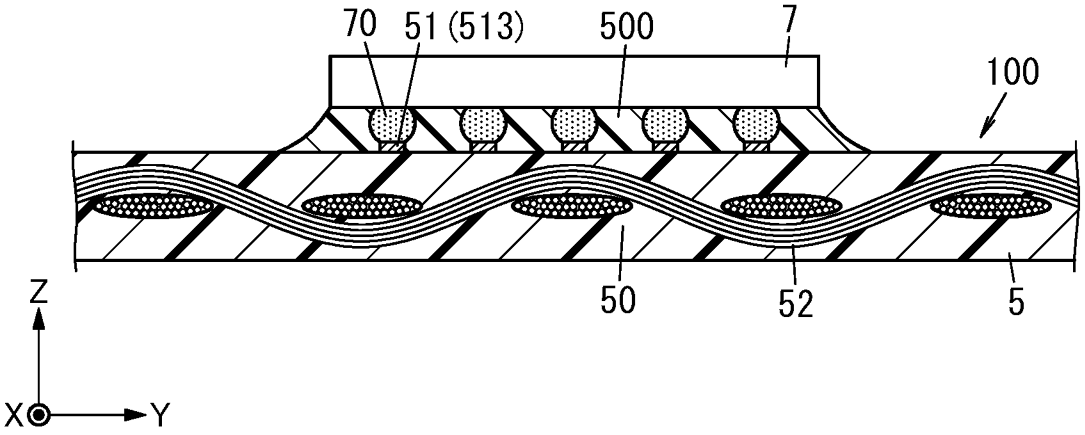
FIG. 9 is a schematic cross-sectional view illustrating a semiconductor package according to the exemplary embodiment of the present disclosure.

FIG. 9 illustrates a semiconductor package 100 according to this embodiment. The semiconductor package 100 includes the printed wiring board 5 and a semiconductor chip 7 mounted on the printed wiring board 5. In this case, the printed wiring board 5 is also called a "package board," a "module board," or an "interposer." The printed wiring board 5 includes at least one insulating layer 50. The insulating layer 50 includes at least one base member 52. Optionally, the insulating layer 50 may include no base member 52.

The insulating layer 50 includes the conductor wiring 51. The conductor wiring 51 includes pads 513. The pads 513 are formed on the surface of the insulating layer 50.

The semiconductor chip 7 is not limited to any particular one. The semiconductor chip 7 includes bumps 70. The bumps 70 are coupled to the pads 513. This allows the semiconductor chip 7 and the printed wiring board 5 to be electrically connected to each other.

An underfilling resin layer 500 is formed between the semiconductor chip 7 and the printed wiring board 5. The underfilling resin layer 500 is formed by filling the gap between the semiconductor chip 7 and the printed wiring board 5 with an underfilling liquid encapsulant and curing the encapsulant.

As can be seen, the semiconductor package 100 according to this embodiment includes the printed wiring board 5, and therefore, may have its warpage reduced and have its flame resistance improved at the same time.

EXAMPLES

Next, the present disclosure will be described specifically by way of specific examples. Note that the examples to be described below are only examples of the present disclosure and should not be construed as limiting.

(1) Resin Composition

Materials for the resin composition are as follows:

<Maleimide Compound (A)>

<<First Maleimide Compound (A1)>>

- A fifth maleimide compound (A5) expressed by the formula (a5), product name "BMI-689" manufactured by Designer Molecules Inc. (DMI), having a maleimide group equivalent of 345 g/ep;
- A fourth maleimide compound (A4) expressed by the formula (a4), product name "BMI-1500" manufactured by Designer Molecules Inc. (DMI), having a maleimide group equivalent of 750 g/ep;

A third maleimide compound (A3) expressed by the formula (a3), product name "BMI-3000" manufactured by Designer Molecules Inc. (DMI), having a maleimide group equivalent of 1500 g/ep;

<<Second Maleimide Compound (A2)>>

A sixth maleimide compound (A6) expressed by the formula (a6), product name "BMI-5100" manufactured by Daiwa Kasei Industry Co., Ltd., having a maleimide group equivalent of 221 g/ep;

<Phosphorus-Containing Compound (B)>

<<Phosphorus-Containing Compound (B1)>>

Reactive flame retardant, product name "SD-5" manufactured by Sanko Co. Ltd., having a phosphorus content of 9.3% by mass;

<<Phosphorus-Containing Compound (B4)>>

Reactive flame retardant (expressed by formula (b4)), diphenyl-2-methacryloyloxyethyl phosphate, product name "MR-260" manufactured by Daihachi Chemical Industry Co., Ltd., having a phosphorus content of 8.0% by mass;

<<Phosphorus-Containing Epoxy Resin>>

Product name "YDFR-290EK75" manufactured by NIPPON STEEL Chemical & Material Co., Ltd., having a phosphorus content of 1.8% by mass;

<<Phosphorus-Containing Phenolic Resin>>

Product name "HPC-9080P" manufactured by DIC Corporation, having a phosphorus content of 8% by mass and a hydroxyl equivalent of 249 g/eq;

<Styrene Copolymer (C)>

Hydrogenated styrene (ethylene/butylene) styrene copolymer, hydrogenated styrene-based thermoplastic elastomer (SEBS), product name "ToughTech® H1051" manufactured by Asahi Kasei Corporation, having a weight average molecular weight of 71,000;

Hydrogenated methylstyrene (ethylene/butylene) methylstyrene copolymer, hydrogenated styrene-based thermoplastic elastomer (SEBS), product name "Septon® V9827" manufactured by Kuraray Co., Ltd., having a weight average molecular weight of 92,000;

<Resin Component (D)>

<<Epoxy Compound>>

Naphthalene epoxy resin, product name "HP-9500" manufactured by DIC Corporation, having an epoxy equivalent of 230 g/eq;

Biphenyl epoxy resin, product name "NC-3000-H" manufactured by Nippon Kayaku Co., Ltd., having an epoxy equivalent of 280-300 g/eq;

<<Phenolic Compound>>

Phenol novolac, product name "TD-2090" manufactured by DIC Corporation, having a hydroxyl equivalent of 105 g/eq;

<Inorganic Filler (E)>

Fused silica, product name "SC2050-MTX" manufactured by Admatechs, having a mean particle size of 0.5 μm;

<Other Components (F)>

2-ethyl-4-methylimidazole, "2E4MZ" manufactured by Shikoku Chemicals Corporation; and α, α'-di (t-butylperoxy) diisopropylbenzene, "Perbutyl P" manufactured by NOF Corporation.

The maleimide compound (A), the phosphorus-containing compound (B), the styrene copolymer (C), the resin component (D), the inorganic filler (E), and the other components (F) were compounded together to have any of the compositions shown in the following Tables 1-3 and mixed with an appropriate solvent. Then, the mixture was stirred up to be homogenized. In this manner, a varnish of the resin composition was prepared. Note that in some comparative examples, no varnish could be prepared.

(2) Prepreg

A prepreg was produced by impregnating the varnish into a piece of glass cloth (#2116 type, WEA116E manufactured by Nitto Boseki Co., Ltd., E glass, having a thickness of 0.1 mm) and then heating and drying the glass cloth impregnated with the varnish for about two to eight minutes to a temperature of 100° C.-160° C.

(3) Metal-Clad Laminate

Two sheets of such prepregs were stacked one on top of the other. The stack thus obtained was sandwiched between two sheets of copper foil, each having a thickness of 12 μm. Then, the assembly was heated to 220° C. under a pressure of 3 MPa for two hours. In this manner, a double-sided copper-clad laminate (as an exemplary double-sided metal-clad laminate) having a thickness of approximately 0.2 mm was manufactured. The following tests were conducted by using this as a board for evaluation.

(4) Tests (4.1) Flame Resistance

Test pieces, each having a length of 125 mm and a width of 12.5 mm, were cut out of the board for evaluation. The test pieces were subjected to flammability tests (vertical flame tests) ten times in accordance with "Test for Flammability of Plastic Materials—UL 94" by Underwriters Laboratories. Specifically, each of five test pieces was subjected to the flammability test twice apiece. The total time for which the test piece continued to burn during the flammability tests was obtained. The test piece was graded as follows in terms of its flame resistance:

"V-0" if the total time was equal to or shorter than 5 seconds;

"V-1" if the total time was longer than 5 seconds; or

"Burned" if the test piece continued to burn to the end.

(4.2) Desmear Resistance

The test pieces were evaluated in terms of their desmear resistance by calculating their desmear etch depth (which is represented by their weight loss). The smaller the desmear etch depth is, the better the desmear resistance is.

The desmear etch depth was calculated by the following equations (8) and (9):

$$M_2(\text{mg})=M_0(\text{mg})-M_1(\text{mg}) \quad (8)$$

$$\text{Desmear etch depth (mg/cm}^2\text{)}=M_2(\text{mg})/S_a(\text{cm}^2) \quad (9)$$

where $M_0$ is the initial mass (mg) of the sample, $M_1$ is the mass (mg) of the sample subjected to the desmear process, $M_2$ is the magnitude of decrease in mass (mg), and $S_a$ is the surface area (cm$^2$) of the sample.

Specifically, the desmear etch depth was calculated through the following process steps:

(4.2.1) Making Sample

A sample was made by removing the sheet of metal foil from a board for evaluation having dimensions of 10 cm×10 cm.

(4.2.2) Initial Drying and Cooling and Measuring Initial Mass

The sample was dried at 130° C. for 30 minutes in a constant-temperature dryer and then cooled at room temperature for 120 minutes or more in a dry desiccator. Thereafter, the initial mass $M_0$ (mg) of the sample was measured using an electronic scale.

(4.2.3) Swelling

After its initial mass had been measured, the sample was immersed in a swelling solution (500 ml/L of "Swelling Dip Securiganth P" manufactured by Atotech Japan, 3 g/L of aqueous solution of sodium hydroxide) at 60° C. for 5 minutes.

(4.2.4) Micro-Etching

The swollen sample was immersed in an oxidant (580 ml/L of "Concentrate Compact CP" manufactured by Atotech Japan, 40 g/L of aqueous solution of sodium hydroxide) at 80° C. for 10 minutes.

(4.2.5) Neutralization

The micro-etched sample was immersed in a neutralizing solution (70 ml/L of "Reduction Solution Securiganth P500" manufactured by Atotech Japan, 50 ml/L of sulfuric acid (98%)) at 40° C. for 5 minutes.

(4.2.6) Drying and Cooling After Treatment and Measuring Mass of Treated Sample

The neutralized sample was washed with water and dried with a dryer. After that, this sample was further dried at 130° C. for 30 minutes in a constant-temperature dryer and then cooled at room temperature for 120 minutes or more in a dry desiccator. Thereafter, the mass $M_1$ (mg) of the sample subjected to the desmear process was measured using an electronic scale.

(4.3) Glass Transition Temperature (Tg)

First, an unclad plate was obtained by etching away the sheet of copper foil from both sides of the board for evaluation. Next, the glass transition temperature (Tg) of the unclad plate was measured using a viscoelasticity spectrometer (DMS100) manufactured by Seiko Instruments, Inc. At this time, a dynamic mechanical analysis (DMA) was carried out using a bending module with the frequency set at 10 Hz. The temperature at which the loss tangent (tan δ) reached a local maximum when the temperature was increased from room temperature to 320° C. at a temperature increase rate of 5° C./min was defined to be the glass transition temperature (Tg).

(4.4) Loss Tangent (tan δ)

The unclad plate was cut out into a strip with a width of 5 mm in a biasing direction forming a tilt angle of 45 degrees with respect to the warp direction of the base member, thereby obtaining a sample with a length of 25 mm. This sample was subjected to a dynamic mechanical analysis (DMA) using a dynamic mechanical spectrometer (DMS6100 manufactured by SII Nanotechnology Inc.) under the condition including a chucking interval of 10 mm, a temperature increase rate of 5° C./min, a frequency of 10 Hz, and a tensile mode adopted. By carrying out this measurement, the loss tangent (tan δ) was obtained as the minimum value within the range from 100° C. to 200° C.

(4.5) Warpage of Package

First, a semiconductor package (PKG) was fabricated to measure the warpage of the package (see FIG. 9). Specifically, unnecessary portions of the sheet of copper foil on one side of the board for evaluation (with dimensions of 12 mm×12 mm) were etched away to form conductor wiring (as pads). In addition, the sheet of copper foil on the other side of the board for evaluation was completely etched away. Meanwhile, a semiconductor chip with dimensions of 10 mm×10 mm×0.1 mm (thickness) was provided. The semiconductor chip had bumps.

Then, the bumps of the semiconductor chip were bonded onto the pads of the board for evaluation and the gap between the board for evaluation and the semiconductor chip was filled with an underfilling liquid encapsulant (product name "CV5300AM" manufactured by Panasonic Corporation), which was then cured. In this manner. a simple semiconductor package for use to measure the warpage of the package was fabricated.

Next, the warpage of the semiconductor package was measured by using a warpage measurement tool (TherMoiré PS200 manufactured by Akrometrix Corporation) based on the shadow moiré measurement theory. Specifically, the warpage of the package was measured in the following manner. The semiconductor package was heated twice. For the first time, the semiconductor package was heated from 30° C. (starting temperature) to 260° C. and then was cooled to 30° C. (ending temperature). For the second time, the semiconductor package was also heated from 30° C. (starting temperature) to 260° C. and then was cooled to 30° C. (ending temperature). When the semiconductor package was heated for the second time, its warpage at the starting temperature was almost the same as its warpage at the ending temperature. Thus, the warpage at 30° C. for the second time was defined to be the warpage of the package.

TABLE 1

| | | | | | Examples | | | | | |
|---|---|---|---|---|---|---|---|---|---|---|
| | | | | | 1 | 2 | 3 | 4 | 5 | 6 |
| Composition | Maleimide compound (A) | (A1) | BMI-689 | Parts by mass | 0 | 0 | 0 | 40 | 0 | 0 |
| | | | BMI-1500 | Parts by mass | 50 | 0 | 40 | 0 | 0 | 20 |
| | | | BMI-3000 | Parts by mass | 0 | 40 | 0 | 0 | 40 | 0 |
| | | (A2) | BMI-5100 | Parts by mass | 0 | 24 | 24 | 24 | 18 | 24 |
| | Phosphorus-containing compound (B) | (B1) | SD-5 | Parts by mass | 50 | 36 | 36 | 36 | 36 | 36 |
| | | (B4) | MR-260 | Parts by mass | 0 | 0 | 0 | 0 | 0 | 0 |
| | | Phosphorus-containing epoxy resin | YDFR-290EK75 | Parts by mass | 0 | 0 | 0 | 0 | 0 | 0 |
| | | Phosphorus-containing phenolic resin | HPC-9080P | Parts by mass | 0 | 0 | 0 | 0 | 0 | 0 |
| | Styrene copolymer (C) | | H1051 | Parts by mass | 0 | 0 | 0 | 0 | 0 | 0 |
| | | | V9827 | Parts by mass | 0 | 0 | 0 | 0 | 0 | 20 |
| | Resin component (D) | Epoxy compound | HP-9500 | Parts by mass | 0 | 0 | 0 | 0 | 0 | 0 |
| | | | NC-3000-H | Parts by mass | 0 | 0 | 0 | 0 | 6 | 0 |
| | | Phenolic compound | TD-2090 | Parts by mass | 0 | 0 | 0 | 0 | 0 | 0 |
| | Inorganic filler (E) | | SC2050-MTX | Parts by mass | 100 | 100 | 100 | 100 | 100 | 100 |
| | Other components (F) | | 2E4MZ | Parts by mass | 0 | 0 | 0 | 0 | 0.1 | 0 |
| | | | PBP | Parts by mass | 1 | 1 | 1 | 1 | 1 | 1 |

TABLE 1-continued

| | | | | | | | | | |
|---|---|---|---|---|---|---|---|---|---|
| Evaluation | Flame retardancy | UL94 vertical flame test | — | V-0 | V-0 | V-0 | V-0 | V-0 | V-0 |
| | Desmear resistance | Weight loss | mg/cm$^2$ | 0.20 | 0.25 | 0.26 | 0.23 | 0.18 | 0.24 |
| | Glass transition temperature (Tg) | DMA | ° C. | 170 | 265 | 265 | 265 | 260 | 265 |
| | tanδ (minimum value in 100° C.-200° C.) | DMA | — | 0.050 | 0.060 | 0.050 | 0.050 | 0.055 | 0.055 |
| | PKG warpage (30° C.) | Shadow moiré | μm | 230 | 190 | 200 | 200 | 190 | 175 |

| | | | | | Examples | | | |
|---|---|---|---|---|---|---|---|---|
| | | | | | 7 | 8 | 9 | 10 |
| Composition | Maleimide compound (A) | (A1) | BMI-689 | Parts by mass | 0 | 0 | 0 | 0 |
| | | | BMI-1500 | Parts by mass | 45 | 50 | 0 | 0 |
| | | | BMI-3000 | Parts by mass | 0 | 0 | 30 | 30 |
| | | (A2) | BMI-5100 | Parts by mass | 22 | 20 | 24 | 24 |
| | Phosphorus-containing compound (B) | (B1) | SD-5 | Parts by mass | 33 | 30 | 36 | 36 |
| | | (B4) | MR-260 | Parts by mass | 0 | 0 | 0 | 0 |
| | | Phosphorus-containing epoxy resin | YDFR-290EK75 | Parts by mass | 0 | 0 | 0 | 0 |
| | | Phosphorus-containing phenolic resin | HPC-9080P | Parts by mass | 0 | 0 | 0 | 0 |
| | Styrene copolymer (C) | | H1051 | Parts by mass | 0 | 0 | 0 | 0 |
| | | | V9827 | Parts by mass | 0 | 0 | 0 | 0 |
| | Resin component (D) | Epoxy compound | HP-9500 | Parts by mass | 0 | 0 | 10 | 0 |
| | | | NC-3000-H | Parts by mass | 0 | 0 | 0 | 10 |
| | | Phenolic compound | TD-2090 | Parts by mass | 0 | 0 | 0 | 0 |
| | Inorganic filler (E) | | SC2050-MTX | Parts by mass | 100 | 100 | 100 | 100 |
| | Other components (F) | | 2E4MZ | Parts by mass | 0 | 0 | 0.1 | 0.1 |
| | | | PBP | Parts by mass | 1 | 1 | 1 | 1 |
| Evaluation | Flame retardancy | | UL94 vertical flame test | — | V-0 | V-0 | V-0 | V-0 |
| | Desmear resistance | | Weight loss | mg/cm$^2$ | 0.24 | 0.24 | 0.12 | 0.12 |
| | Glass transition temperature (Tg) | | DMA | ° C. | 265 | 265 | 265 | 272 |
| | tanδ (minimum value in 100° C.-200° C.) | | DMA | — | 0.060 | 0.065 | 0.050 | 0.050 |
| | PKG warpage (30° C.) | | Shadow moiré | μm | 190 | 185 | 230 | 230 |

TABLE 2

| | | | | | Examples | | | | | | |
|---|---|---|---|---|---|---|---|---|---|---|---|
| | | | | | 11 | 12 | 13 | 14 | 15 | 16 | 17 |
| Composition | Maleimide compound (A) | (A1) | BMI-689 | Parts by mass | 0 | 0 | 0 | 0 | 0 | 0 | 0 |
| | | | BMI-1500 | Parts by mass | 30 | 30 | 0 | 0 | 0 | 20 | 25 |
| | | | BMI-3000 | Parts by mass | 0 | 0 | 15 | 15 | 30 | 0 | 0 |
| | | (A2) | BMI-5100 | Parts by mass | 24 | 24 | 24 | 24 | 0 | 20 | 20 |
| | Phosphorus-containing compound (B) | (B1) | SD-5 | Parts by mass | 36 | 36 | 36 | 36 | 36 | 30 | 30 |
| | | (B4) | MR-260 | Parts by mass | 0 | 0 | 0 | 0 | 0 | 0 | 0 |
| | | Phosphorus-containing epoxy resin | YDFR-290EK75 | Parts by mass | 0 | 0 | 0 | 0 | 0 | 0 | 0 |
| | | Phosphorus-containing phenolic resin | HPC-9080P | Parts by mass | 0 | 0 | 0 | 0 | 0 | 0 | 0 |
| | Styrene copolymer (C) | | H1051 | Parts by mass | 0 | 0 | 15 | 15 | 0 | 0 | 0 |
| | | | V9827 | Parts by mass | 0 | 0 | 0 | 0 | 0 | 20 | 15 |
| | Resin component (D) | Epoxy compound | HP-9500 | Parts by mass | 10 | 10 | 10 | 7 | 0 | 0 | 0 |
| | | | NC-3000-H | Parts by mass | 0 | 0 | 0 | 0 | 34 | 10 | 10 |
| | | Phenolic compound | TD-2090 | Parts by mass | 0 | 0 | 0 | 3 | 0 | 0 | 0 |
| | Inorganic filler (E) | | SC2050-MTX | Parts by mass | 100 | 0 | 100 | 100 | 100 | 100 | 100 |
| | Other components (F) | | 2E4MZ | Parts by mass | 0.1 | 0.1 | 0.1 | 0.1 | 0.1 | 0.1 | 0.1 |
| | | | PBP | Parts by mass | 1 | 1 | 1 | 1 | 1 | 1 | 1 |
| Evaluation | Flame retardancy | | UL94 vertical flame test | — | V-0 | V-0 | V-0 | V-0 | V-0 | V-0 | V-0 |
| | Desmear resistance | | Weight loss | mg/cm$^2$ | 0.12 | 0.10 | 0.15 | 0.16 | 0.10 | 0.26 | 0.26 |
| | Glass transition temperature (Tg) | | DMA | ° C. | 265 | 270 | 260 | 250 | 250 | 262 | 262 |

TABLE 2-continued

| | | | Examples | | | | | | |
|---|---|---|---|---|---|---|---|---|---|
| | | | 11 | 12 | 13 | 14 | 15 | 16 | 17 |
| tanδ (minimum value in 100° C.-200° C.) | DMA | — | 0.050 | 0.055 | 0.052 | 0.055 | 0.050 | 0.055 | 0.055 |
| PKG warpage (30° C.) | Shadow moiré | μm | 230 | 210 | 200 | 210 | 230 | 210 | 200 |

TABLE 3

| | | | | | Comparative examples | | | | | | |
|---|---|---|---|---|---|---|---|---|---|---|---|
| | | | | | 1 | 2 | 3 | 4 | 5 | 6 | 7 |
| Composition | Maleimide compound (A) | (A1) | BMI-689 | Parts by mass | 0 | 0 | 0 | 0 | 0 | 0 | 0 |
| | | | BMI-1500 | Parts by mass | 0 | 0 | 0 | 0 | 0 | 0 | 0 |
| | | | BMI-3000 | Parts by mass | 40 | 40 | 0 | 100 | 0 | 0 | 0 |
| | | (A2) | BMI-5100 | Parts by mass | 24 | 24 | 40 | 0 | 24 | 34.3 | 24 |
| | Phosphorus-containing compound (B) | (B1) | SD-5 | Parts by mass | 0 | 0 | 60 | 0 | 36 | 51.4 | 36 |
| | | (B4) | MR-260 | Parts by mass | 0 | 0 | 0 | 0 | 0 | 0 | 0 |
| | | Phosphorus-containing epoxy resin | YDFR-290EK75 | Parts by mass | 36 | 0 | 0 | 0 | 0 | 0 | 0 |
| | | Phosphorus-containing phenolic resin | HPC-9080P | Parts by mass | 0 | 36 | 0 | 0 | 0 | 0 | 0 |
| | Styrene copolymer (C) | | H1051 | Parts by mass | 0 | 0 | 0 | 0 | 0 | 0 | 0 |
| | | | V9827 | Parts by mass | 0 | 0 | 0 | 0 | 40 | 0 | 30 |
| | Resin component (D) | Epoxy compound | HP-9500 | Parts by mass | 0 | 0 | 0 | 0 | 0 | 0 | 0 |
| | | | NC-3000-H | Parts by mass | 0 | 0 | 0 | 0 | 0 | 14.3 | 10 |
| | | Phenolic compound | TD-2090 | Parts by mass | 0 | 0 | 0 | 0 | 0 | 0 | 0 |
| | Inorganic filler (E) | | SC2050-MTX | Parts by mass | 100 | 100 | 100 | 100 | 100 | 100 | 100 |
| | Other components (F) | | 2E4MZ | Parts by mass | 0 | 0 | 0 | 0 | 0 | 0.1 | 0.1 |
| | | | PBP | Parts by mass | 1 | 1 | 1 | 1 | 1 | 1 | 1 |
| Evaluation | Flame retardancy | | UL94 vertical flame test | — | Varnish could not be prepared | | V-0 | burned | burned | V-0 | V-1 |
| | Desmear resistance | | Weight loss | $mg/cm^2$ | | | 0.17 | 0.11 | 0.70 | 0.10 | 0.70 |
| | Glass transition temperature (Tg) | | DMA | ° C. | | | 270 | 70 | 270 | 270 | 270 |
| | tanδ (minimum value in 100° C.-200° C.) | | DMA | — | | | 0.001 | 0.050 | 0.050 | 0.001 | 0.055 |
| | PKG warpage (30° C.) | | Shadow moiré | μm | | | 350 | 120 | 120 | 350 | 170 |

REFERENCE SIGNS LIST

1 Prepreg
10 Resin Layer
11 Base Member
2 Film with Resin
20 Resin Layer
21 Supporting Film
3 Sheet of Metal Foil with Resin
30 Resin Layer
31 Sheet of Metal Foil
4 Metal-Clad Laminate
40 Insulating Layer
41 Metal Layer
5 Printed Wiring Board
50 Insulating Layer
51 Conductor Wiring

The invention claimed is:

1. A resin composition containing a maleimide compound (A) and a phosphorus-containing compound (B), the maleimide compound (A) including a first maleimide compound (A1) having an alkyl group, of which a carbon number is equal to or greater than six, and/or an alkylene group, of which a carbon number is equal to or greater than six, and a second maleimide compound (A2) having a maleimide group equivalent less than 400 g/eq, a content of the second maleimide compound (A2) with respect to the entire mass of the maleimide compound (A) being equal to or greater than 28.57% by mass and equal to or less than 65% by mass, and the phosphorus-containing compound (B) including a phosphorus-containing compound (B1) having a structure expressed by the following formula (b1):

(b1)

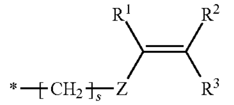

where s indicates an integer falling within a range from 1 to 10, Z indicates either an arylene group or an ester bond expressed by the following formula (b1.1), $R^1$ to $R^3$ each independently indicate either a hydrogen atom or a monovalent organic group, and * indicates a bond:

(b1.1)

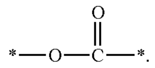

2. The resin composition of claim 1, wherein a phosphorus content of the phosphorus-containing compound (B) is equal to or greater than 7% by mass with respect to an entire mass of the phosphorus-containing compound (B).

3. The resin composition of claim 1, wherein the phosphorus-containing compound (B1) has both a structure expressed by either the following formula (b2.1) or the following formula (b2.2) and a structure expressed by either the following formula (b3.1) or the following formula (b3.2):

(b2.1)

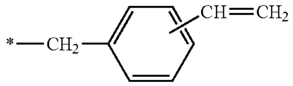

where * indicates a bond, (b2.2)

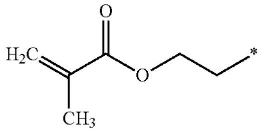

where * indicates a bond, (b3.1)

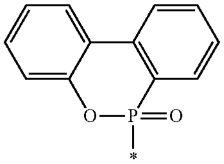

where * indicates a bond, (b3.2)

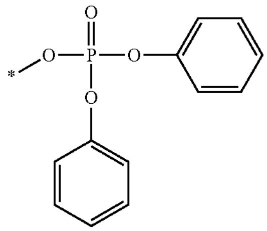

where * indicates a bond.

4. The resin composition of claim 1, wherein the first maleimide compound (A1) has a maleimide group equivalent equal to or greater than 400 g/eq.

5. The resin composition of claim 1, wherein the maleimide compound (A) includes at least one selected from the group consisting of a third maleimide compound (A3) expressed by the following formula (a3), a fourth maleimide compound (A4) expressed by the following formula (a4), and a fifth maleimide compound (A5) expressed by the following formula (a5):

(a3)

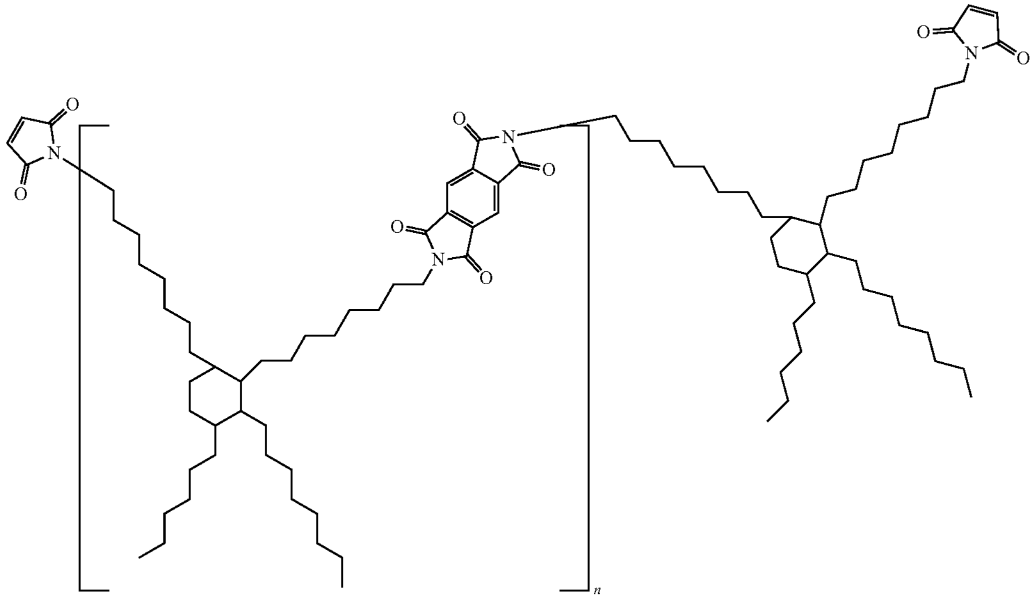

where n is an integer falling within a range from 1 to 10,

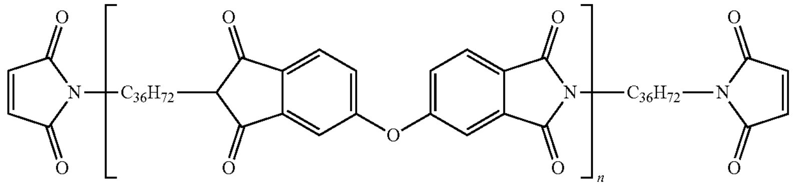

(a4)

where n is an integer falling within a range from 1 to 10,

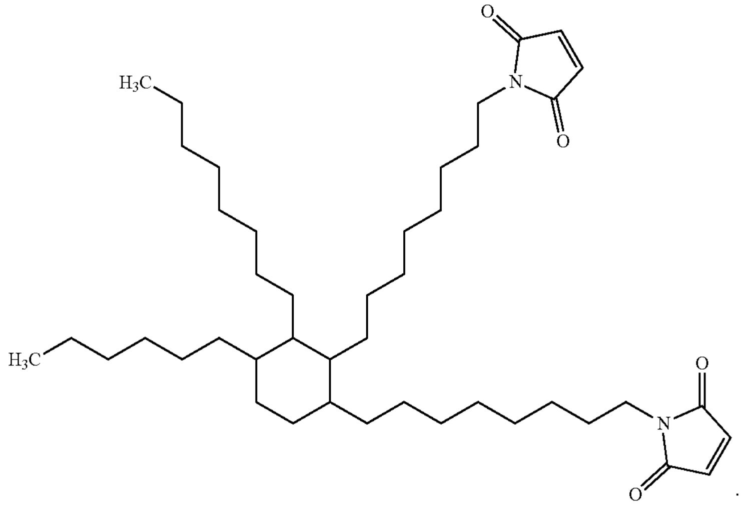

(a5)

6. The resin composition of claim 1, further containing a non-hydrogenated product of a styrene copolymer (C) and/or a hydrogenated product of the styrene copolymer (C), wherein a weight average molecular weight of the styrene copolymer (C) is equal to or greater than 10,000 and equal to or less than 150,000.

7. The resin composition of claim 6, wherein the styrene copolymer (C) includes at least one selected from the group consisting of: a methylstyrene (ethylene/butylene) methylstyrene copolymer; a methylstyrene (ethylene-ethylene/propylene) methylstyrene copolymer; a styrene-isoprene copolymer; a styrene-isoprene-styrene copolymer; a styrene (ethylene/butylene) styrene copolymer; a styrene (ethylene-ethylene/propylene) styrene copolymer; and hydrogenated products thereof.

8. The resin composition of claim 6, further containing a resin component (D), wherein the resin component (D) includes at least one selected from the group consisting of: epoxy compounds; phenolic compounds; polyphenylene ether compounds; modified polyphenylene ether compounds each having a reactive unsaturated group; benzoxazine compounds; radically polymerizable compounds each having a polymerizable unsaturated group; cyanate ester compounds; and amine compounds.

9. The resin composition of claim 8, wherein with respect to 100 parts by mass in total of the maleimide compound (A), the styrene copolymer (C), and the resin component (D), content of the maleimide compound (A) is equal to or greater than 20 parts by mass and equal to or less than 50 parts by mass, and content of the styrene copolymer (C) is equal to or greater than 10 parts by mass and equal to or less than 40 parts by mass.

10. A prepreg comprising: a base member; and a resin layer containing either the resin composition of claim 1 or a semi-cured product of the resin composition, the resin composition or the semi-cured product of the resin composition being impregnated into the base member.

11. A film with resin, comprising: a resin layer containing either the resin composition of claim 1 or a semi-cured product of the resin composition; and a supporting film supporting the resin layer.

12. A sheet of metal foil with resin, comprising: a resin layer containing either the resin composition of claim 1 or a semi-cured product of the resin composition; and a sheet of metal foil bonded to the resin layer.

13. A metal-clad laminate comprising: an insulating layer containing a cured product of the resin composition of claim 1; and a metal layer bonded to the insulating layer.

14. A printed wiring board comprising: an insulating layer containing a cured product of the resin composition of claim 1; and conductor wiring formed on the insulating layer.

15. A metal-clad laminate comprising: an insulating layer containing a cured product of the prepreg of claim 10; and a metal layer bonded to the insulating layer.

16. A printed wiring board comprising: an insulating layer containing a cured product of the prepreg of claim 10; and conductor wiring formed on the insulating layer.

17. The resin composition of claim 1, wherein the second maleimide compound (A2) includes 3,3'-dimethyl-5,5'-diethyl-4,4'-diphenylmethane bismaleimide expressed by the following formula (a6):
(a6)
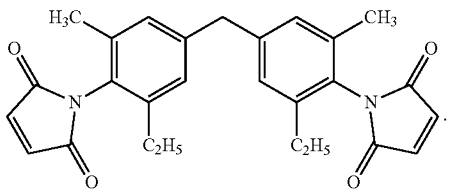
* * * * *